United States Patent [19]

Lingenhoff

[11] Patent Number: 4,917,158

[45] Date of Patent: Apr. 17, 1990

[54] DISPENSING DEVICE FOR FLUID PRODUCTS

[75] Inventor: Berthold Lingenhoff, Hilden, Fed. Rep. of Germany

[73] Assignee: Hamba Maschinenfabrik Hans A. Muller GmbH and Co. KG, Wuppertal, Fed. Rep. of Germany

[21] Appl. No.: 168,870

[22] Filed: Mar. 16, 1988

[30] Foreign Application Priority Data

Apr. 10, 1987 [DE] Fed. Rep. of Germany ....... 3712245

[51] Int. Cl.$^4$ .............................................. B67D 5/52
[52] U.S. Cl. ..................................... 141/258; 141/261;
141/238; 141/89; 222/137; 222/145; 222/255;
222/378; 222/383
[58] Field of Search ................... 141/256, 144, 1, 237,
141/242, 258-262, 239, 243-245, 89-91, 392;
222/378, 380, 330, 383, 255, 275, 276, 137, 145;
417/517

[56] References Cited

U.S. PATENT DOCUMENTS

| | | | |
|---|---|---|---|
| 4,621,747 | 11/1986 | van der Velde et al. | 222/137 |
| 4,667,709 | 5/1987 | Fischer et al. | 141/91 |
| 4,711,277 | 12/1987 | Clish | 141/392 X |
| 4,767,031 | 8/1988 | Pröepper | 141/261 X |

FOREIGN PATENT DOCUMENTS

| | | |
|---|---|---|
| 7338865 | 10/1973 | Fed. Rep. of Germany . |
| 3206141 | 9/1983 | Fed. Rep. of Germany . |
| 3412628 | 10/1985 | Fed. Rep. of Germany . |
| 3012978 | 12/1986 | Fed. Rep. of Germany . |
| 1118478 | 3/1956 | France ............................ 141/258 |
| 2576098 | 7/1986 | France . |

Primary Examiner—Ernest G. Cusick
Attorney, Agent, or Firm—Herbert Dubno

[57] ABSTRACT

A dispensing device for fluid products, such as dairy products, has a coaxially positioned valve cylinder inside a dispensing cylinder, both connected at their upper end to the product source. The dispensing piston is in the form of a ring piston which slides on the valve cylinder. The two pistons are fully immersed in product, and air entrainment is prevented.

15 Claims, 3 Drawing Sheets

DISPENSING DEVICE FOR FLUID PRODUCTS

FIELD OF THE INVENTION

The invention refers to a device for dispensing fluid products, especially for dairy products, oleaginous products, and the like which range from low viscosity to pasty in consistency.

BACKGROUND OF THE INVENTION

Previously known dispensing devices, in particular, piston dispensing devices, have been used for the filling of dairy product containers, for example, yoghurt cups. For each row of cups conveyed past the container filling location, there has typically been one filling device.

The known filling devices have, arranged in a axis-parallel manner one behind the other, a dispensing cylinder and a valve cylinder; the valve cylinder typically projects axially below the bottom of the dispensing cylinder with its product exit located axially for feeding product to a single cup.

The lower dead space of the dispensing cylinder, to which the dispensing piston reaches only during the cleaning phase, communicates with the interior of the valve cylinder by way of a radially extended flow channel. The flow opening is located thus at an axial elevation between the lower and upper limiting positions of a valve piston.

The known valves are for this reason quite troublesome since there are generally two valve pistons on a single valve stem, both of which are critical for the dispensing operation.

The upper valve piston works in conjunction with an upper region of the valve cylinder and the lower valve piston works in conjunction with the lower region of the valve cylinder.

In the known dispensing devices, the product inflow takes place from above into the upper axial valve cylinder region. The product outflow subsequently takes place from the lower axial valve cylinder region. The space in the lower part of the dispensing cylinder which lies below the filling surface, minus the dead space, represents the dispensing volume. The upper space in the dispensing cylinder above the dispensing piston is not involved in the product flow and serves only during the cleaning phase as a receiver for the cleaning fluid; otherwise it is nonfunctional during the regular dispensing process.

OBJECTS OF THE INVENTION

A principal object of the invention is to provide a dispensing device of simpler and more compact construction than those heretofore available.

A further object is to provide an improved dispensing device which is suitable for use in a filling operation for simultaneously filling several containers.

Still another object is to provide an improved dispensing device with more reliable operation for viscons material by virtue of a reduction in the number of parts.

A further object is to provide a dispensing device which will perform filling without allowing the undesirable entry of air, even with viscous or pasty products such as cream cheese.

SUMMARY OF THE INVENTION

The objects of the invention are achieved with a device for dispensing fluid products which comprises a mounting means for connection of the device to the product source (such as the product container), a dispensing cylinder mounted thereby, having a dispensing piston in the dispensing cylinder.

This dispensing piston is movable between an upper and a lower limiting position; this piston serves, on one hand, to make a fluid-tight seal between the upper and lower regions of the dispensing cylinder, and on the other hand, it serves as the means for suctioning the product into the dispensing cylinder in the suctioning stroke and forcing it out of the dispensing cylinder in the dispensing stroke.

The device also has a valve cylinder, which in one feature of the invention is coaxial to the dispensing cylinder; the valve cylinder has a valve piston which can move between a lower and an upper limiting position.

By suitable setting of the piston driving means, in a manner well known for machines having multiple pistons, it is provided that the valve piston is in its lower limiting position when the dispensing piston moves toward its upper limiting position.

The valve cylinder has, towards its lower end, a product flow opening which serves as a means for product flow between the valve cylinder and a space at the lower end of the dispensing cylinder, this space being a "dead space" i.e. below the lower limiting position of the dispensing piston. This flow opening in the valve cylinder is between the upper limiting position and the lower limiting position of the valve piston.

The flow opening serves as a product inlet from the valve cylinder to the dispensing cylinder when the valve piston is in its lower limiting position, and the dispensing piston is rising (the suction stroke), and this same flow outlet serves as a product outlet from the dispensing cylinder to the product dispensing means, i.e. to one or more channels for delivering product to the vessels to be filled, in the dispensing stroke when the valve piston is in its upper limiting position and the dispensing piston is in the dispensing stroke.

An advantageous and novel feature of our invention has the dispensing piston configured as a ring or annular piston, preferably circular, the inner cylindrical surface of which slides on, and makes a seal with, the outer cylindrical surface of the valve cylinder, the valve cylinder being located within and preferably coaxial to the dispensing cylinder.

In the novel device of the invention, the valve piston means is a single valve piston. A further advantageous and novel feature of our invention is that the valve cylinder and the dispensing cylinder are both open upwards to the downward flow of said product.

In an advantageous feature of the invention, these upper openings are conjoined to a single product drain or product downflow opening, which can advantageously be situated in the floor of a product container. By having the dispensing piston configured as a ring piston, which uses the outer cylindrical surface of the valve cylinder as a sliding surface for its inner ring piston surface, several important advantages accrue. By this means, the dispensing device of the invention achieves a compact and outwardly uniform-overall cylindrical form. Making uniform the height diemsion makes possible an especially closed-packed manifold dispensing device, especially suitable for simultaneously filling closely packed adjacent cuplike receptacles, such as thermoformed receptacles, as part of a forming, filling, and closing machine. Moreover, by having the valve cylinder constructed within the dispensing cylinder, and both preferably circular and coaxial, the construction, mounting, cleaning and servicing are simplified.

Further simplification is achieved in that the dispensing device in accordance with the invention needs only a single valve piston, which reduces cost and makes operation and cleaning more reliable.

A further major advantage of the dispensing device of the invention derives from the feature that not only both the lower and upper sides of the dispensing piston but also both the lower and upper sides of the valve piston are immersed in the product. By virtue of this feature—as already shown in the device of German Patent 30 12 978—it is possible to pump the product smoothly and to fill containers without allowing the undesirable entrainment of air in the product, or undue contact of air with the product.

Especially compact construction, in accordance with a further advantageous feature of the invention, is made possible by avoiding space-demanding feed conduits. This is accomplished by having the dispensing cylinder and the valve cylinder both open at the top and both connected directly to a product feed means, such as a product drain arranged below a product container.

BRIEF DESCRIPTION OF THE DRAWING

The above and other objects, features and advantages of the present invention will become more readily apparent from the following description, reference being made to the accompanying highly diagrammatic drawing in which.

SPECIFIC DESCRIPTION

Figure 1:
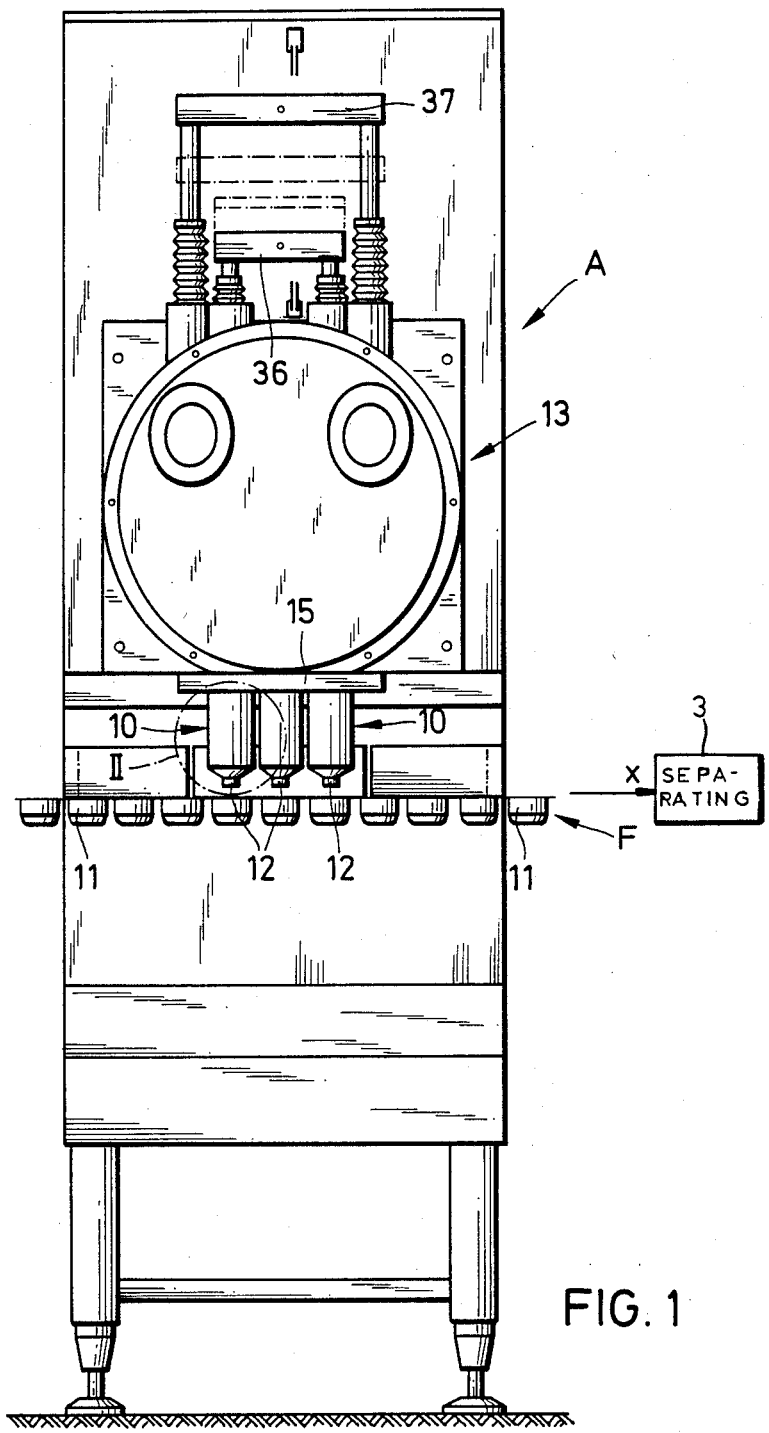
FIG. 1 is a highly diagrammatic representation of a partial front view of a forming, filling, and closing machine, wherein a number of identical dispensing devices of the invention are arranged behind and next to one another and directly below a product container.

In the drawing, the dispensing devices are as a group designated by the reference numbers 10 and 10a. Parts of the dispensing devices 10 and 10a which are functionally analogous to one another are provided with identical reference numbers.

In FIG. 1, the filling unit of a forming, filling and closing machine is, in its totality, designated with the letter A. Therein, a lengthwise section of a thermoplastic sheet F is depicted, which (in a manner which is not depicted) has been thermoformed by a deep drawing process so as to have a number of cuplike molded receptacles 11 (hereinafter called cups) arranged behind and next to one another. In the embodiment illustrated, there is an arrangement of dispensing devices 10 in a three-by-three square array, such that their delivery pattern matches the arrangement of the cups. The devices are preferably arranged behind and next to one another in the closest possible space-saving "spherical packing pattern." The direction of movement of the thermoformed sheet F with the cups 11 is indicated to be in the direction x.

By way of the product outlet nozzles 12 of the dispensing devices 10, none cups 11 are filled in a single stroke. After filling, the cup-bearing sheet F is advanced on in the next cycle to the separating station 3 in the direction x. Each filling operation requires that each dispensing device 10 must deliver the correct amount of material.

The nine dispensing devices 10 are suspended in a certain mounting arrangement from the floor 15 of a product container which is overall designated as 13, the features of this arrangement being further delineated in FIGS. 2a and 2b and 3a and 3b.

In accordance with FIGS. 2a and 2b and 3a and 3b, each of the dispensing cylinders 14 of the dispensing devices 10, 10a is mounted by being tightly sealed into a product outflow opening 16 in the floor 15 of the product container 13.

Within the dispensing cylinder 14 is a dispensing piston 17 in the form of a ring piston, which is capable of being driven up and down.

For purposes of simplification of the FIGURES, half sections are depicted for both the ring piston 17 as well as the valve piston 18, which is located centrally within a valve cylinder 19 and which also is capable of being driven up and down; the two half sections separately represent two phases (strokes) in the operation of the ring piston 17 and the valve piston 18. Moreover, the lower limiting position of the metering ring piston 17 is designated by $U_k$ and the upper limiting position of this piston 17 by $R_k$ (shown in dot-dash lines in FIGS. 2a, 2b), likewise the lower limiting position of the valve piston 18 is represented by $U_v$ and the upper limiting position of the valve piston 18 is represented by $O_v$.

The structures of the dispensing devices 10 and 10a are best explained in relation to their function, thusly:

During the suctioning stroke, the valve piston 18 first occupies its lower limiting position $U_v$ immediately above the product outflow nozzle 12, thus it is held in the lower axial region 20 of the valve cylinder 19.

During the suction or intake stroke, the dispensing piston 17 is positioned in its lower limiting position $U_k$. While the dispensing piston 17 moves in the direction of its upper limiting position $P_k$, it draws the product, via the product drain opening 16 and via a product conduit 22 which connects in common to both the dispensing cylinder 14 and the valve cylinder 19, downward centrally through the interior channel 23. Thence, the product is drawn through a ring-shaped hiatus (gap or circumferentially-continuous opening) 24 (FIGS. 2a and 2b) or through a flow aperture 25 (FIG. 3b) into the dispensing volume 26 of the dispensing cylinder. The ring-shaped hiatus 24 or the flow aperture 25 is located between the lower axial part 20 of the valve cylinder 19 and an axial part 21 of the valve cylinder 19 located above this axial part 20.

The suction stroke lasts long enough that the dispensing piston 17 reaches its upper limiting position $P_k$. When this occurs, the valve piston 18 rises. While at this stage the upper axial region 27 of the valve piston has cut off to some degree the lower axial region 28 of the upper axial valve cylinder region, then, the flow outlet openings 24 or 25 begin to open at their lower regions so that the downward-directed exhaust stroke, the actual dispensing stroke, of the dispensing piston 17 can begin.

Figures 3A, 3B:
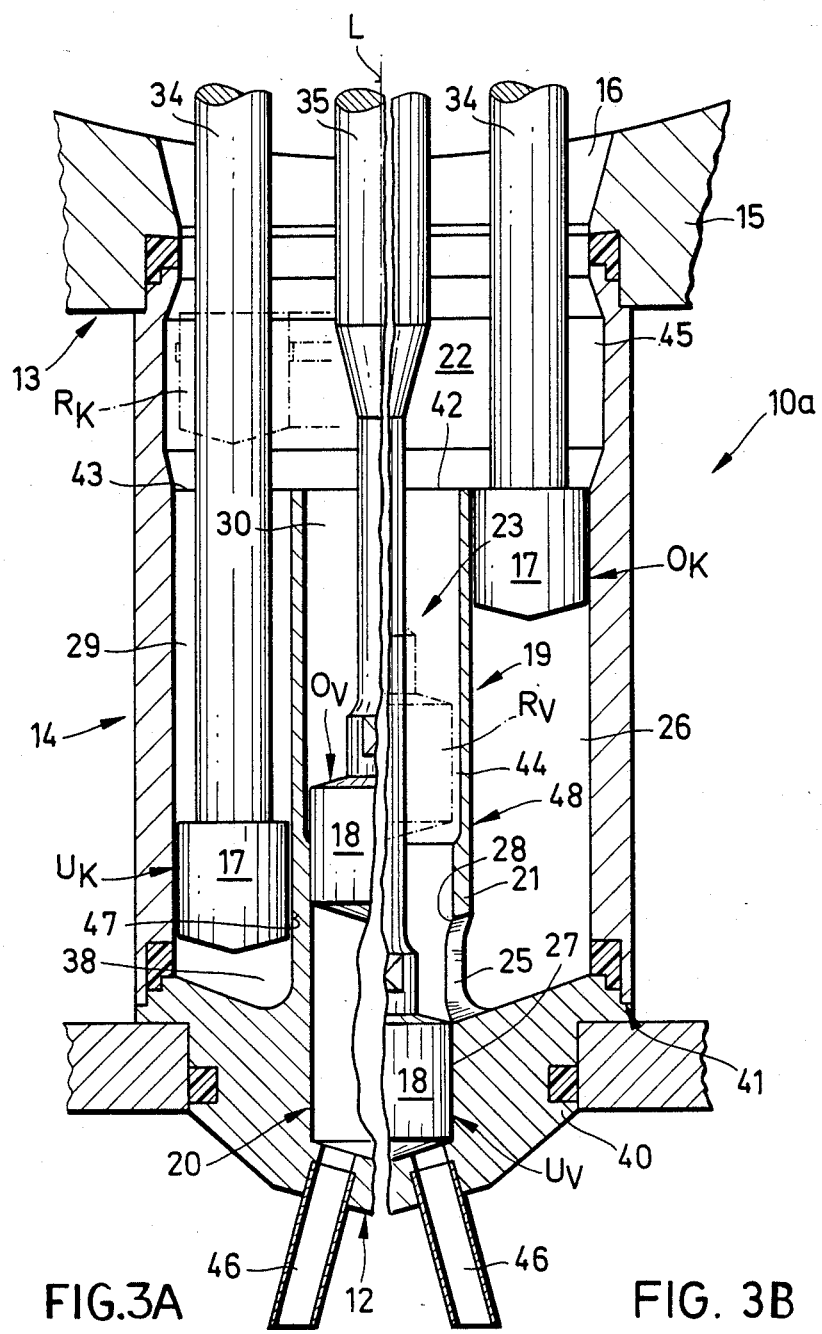
FIGS. 3a and 3b are sectional views which show an individual dispensing device differing in form from that shown in FIGS. 2a and 2b, but in views similar to these figures.

During the downward-directed exhaust stroke of the dispensing piston 17, the liquid product is impelled through the flow apertures 25 or hiatus 24 below the valve piston 18 which at that stage is coming to its upper limiting position $O_v$, and thence, through the lower axial valve cylinder region 20 and, in certain embodiments, the product is impelled through filling tubules 46 (FIGS. 3a and 3b).

Thus, the product is impelled out of the dispensing device into the containers to be filled (for example, the cuplike receptacles 11 shown in FIG. 1). Upon reaching its lower limiting position $U_k$, the dispensing piston 17 ends its exhaust stroke, i.e. its filling stroke, thus having delivered the predetermined quantity of product fill to the desired receptacle (cup in the case shown in FIG. 1).

At the start of the next suction stroke, the valve piston 18 moves down into the lower axial region 20 of the valve cylinder, at which point a new working cycle begins with the suction stroke of the dispensing piston 17.

It remains to be mentioned that, during the downward stroke of the dispensing piston 17, the liquid product obviously is drawn via the commong product channel 16 and 22 into the upper interior cylinder space 29 of the dispensing cylinder 14. In the same way, the upper interior cylinder space 30 of the valve cylinder is continually filled with product.

In this way, it can be assured that during the movement of the dispensing piston 17 and the valve piston 18, air from outside cannot penetrate to the product being dispensed. In this connection, it is also relevant that with highly viscous or pasty products, there is adequate protection against air being sucked in during the upwards stroke of the valve piston 18. This is accomplished for example in one feature of the invention if the total volume of the filling tubules 46, in which a high viscosity product remains after the filling stroke, is greater than the stroke volume inside the lower axial valve cylinder region 20, thus hindering air entry.

For the further refinement of the device, the following is to be mentioned:

In the embodiment of the invention in accordance with FIG. 2, the valve cylinder 19 is to a degree suspended within the dispensing cylinder 14. This is accomplished by having on the valve cylinder 19 an upper attachment flange 31, which is sealingly supported on the upper face 32 of the dispensing cylinder 14.

In this arrangement, the valve cylinder sealing flange 31 has several circumferentially-divided apertures 33 sealed with the dispensing cylinder 14 by means of a seal 50 which extend to the upper axial region of the wall of the valve cylinder 19. The apertures 33 serve on one hand for the conductance of the liquid product; on the other hand they belong to the common product channel 22, but they also make possible an axial penetration by a piston rod arrangement which consists of three individual piston rods 34 which are arranged at circumferential angles of 120° with respect to one another.

The centrally arranged valve piston rod is designated as 35. The piston rods 34 and 35 extend up into the product container 13 and there they are attached to their driving means. In this regard, the valve piston stesm 35, for instance by way of a yoke arrangement 36, and the dispensing piston stems 34, for instance by way of a yoke arrangement 37, are moved up and down by driving means which are not shown. The dispensing stroke is adjustable in a known way to adjust the dispensed volume.

The valve cylinder 19 and the dispensing cylinder 14 are arranged coaxially with respect to one another with reference to a common central axis L.

The interior cylindrical space below the lower limiting position $U_k$ of the dispensing piston 17 is the lower dispensing cylinder "dead space" 38. The flow apertures 24 and 25 are located in the upper axial region of the lower dispensing cylinder dead space. In accordance with FIGS. 2a and 2b, the lower dispensing cylinder dead space is bounded by a plane through which the lower radially-extending lower face 39 of the upper valve cylinder region 20 penetrates.

Figures 2A, 2B:
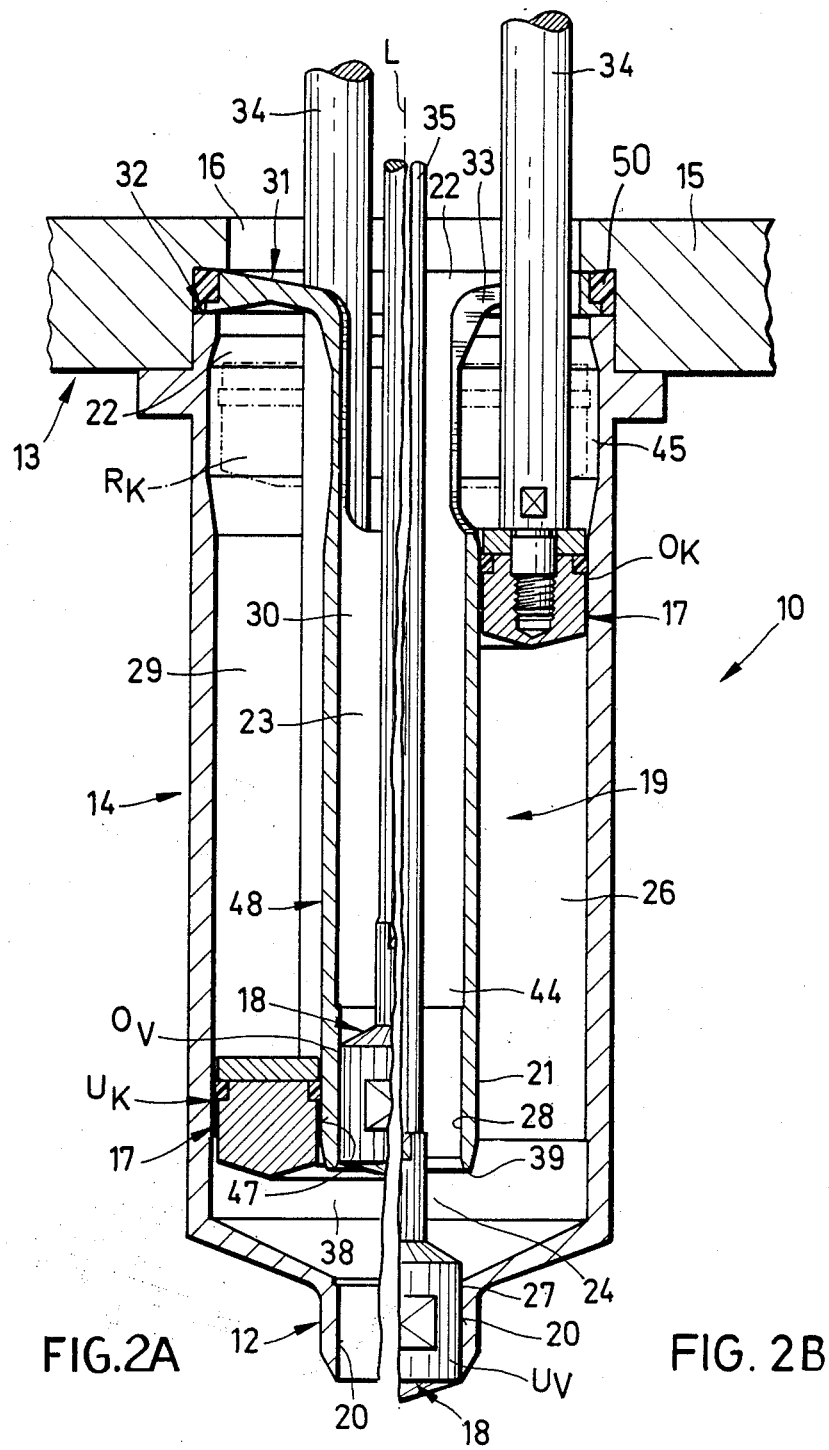
FIGS. 2a and 2b are sectional representations of a part of the dispensing device of FIG. 1, specifically one of the individual dispensing devices, such as the one marked II and enclosed by a dashed circle in FIG. 1 in two different positions.

In contradistinction to the embodiment in accordance with FIGS. 3a, 3b, in the embodiment in accordance with FIGS. 2a and 2b, the lower axial valve cylinder region 20, occupied by the valve piston 18 when it is in its lower limiting position, is constructed as a single piece together with the dispensing cylinder 14. In the embodiment in accordance with FIGS. 3a, 3b, on the other hand, the region 20 is formed as a single piece with the valve cylinder 19. The valve cylinder 19 in this case has a lower attachment flange 40, which is sealingly supported on the lower face 41 of the dispensing cylinder 14.

In this embodiment in accordance with FIGS. 3a, 3b, the valve cylinder 19 projects essentially freely upwards from its attachment flange 40. In this way, the valve cylinder 19 presents a circular upper opening 42 and the dispensing cylinder 14 presents a circular upper opening 43. The circular upper openings 42 and 43 are coaxial and at the same plane of elevation.

The dispensing devices 10 and 10a assure also an advantageous throughput path for a flushing or cleaning fluid; in a flushing or cleaning operation, the valve piston 18 is placed at $R_v$ at a widening 44 of the valve cylinder and the dispensing piston is placed at $R_x$ at a widening 45 of the dispensing cylinder.

It must be further explained that the dispensing piston 17 with its circularly cylindrical inner surface 47 slides (travels on and makes a seal with) the circularly cylindrical outer surface 48 of the valve cylinder 19.

We claim:

1. A fluid product dispensing device which comprises:

mounting means for connection to a product source;

an upright annular dispensing cylinder on said mounting means surrounding an axially extending annular wall;

an annular dispensing piston in said dispensing cylinder riding along an outer surface of said wall, said dispensing piston being movable between an upper and a lower limiting position and making a fluid-tight seal between upper and lower regions of said dispensing cylinder;

a single valve cylinder in said device surrounded by said dispensing cylinder and defined by an inner surface of said wall;

a single valve piston for said device axially displaceable in said valve cylinder, said valve piston riding on said inner surface of said wall and being movable between an upper limiting position and a lower limiting position, and arranged to be in a lower limiting position when said dispensing piston moves toward its upper limiting position;

means at a lower end of said dispensing cylinder defining a flow opening which opens from a space at the lower end of said dispensing cylinder below the lower limiting position of said dispensing piston into said valve cylinder, said flow opening being located between the upper limiting position and the lower limiting position of said valve piston and serving as a product inlet from said valve cylinder to said dispensing cylinder when said valve piston is in its lower limiting position blocking outflow from said space, and serving for product outflow from said space when said valve piston is in its upper limiting position; and means forming at least one product dispensing channel for conveying said product outflow from said space, so that said dispensing piston moves in said dispensing cylinder toward its lower limiting position when said valve piston is in its upper limiting position to discharge said product from said dispensing channel, said upper limiting position of said dispensing piston lying above a bottom of said wall to permit said product to enter said dispensing cylinder when said valve piston in is its lower limiting position.

2. A fluid product dispensing device, comprising:
mounting means for connection to a product source; and a least one dispensing unit below said source, said at least one dispensing unit including:

a housing mounted on a vertical axis, said housing having a bottom end formed with an outlet for product downflow and forming an outer cylinder open upwardly to a flow of a product from said source, an annular dispensing piston movable up and dlow in said outer cylinder between an upper limiting position and a lower limiting position of said dispensing piston, an inner cylinder in said outer cylinder, said inner cylinder being formed with a peripheral wall having an inner surface and an outer surface extending between upper and lower regions of said inner cylinder, said outer surface defining an inner surface of said outer cylinder, a valve piston movable up and down between an upper limiting position and a lower limiting position in said inner cylinder, said outlet for product downflow being blocked in lower limiting position of said valve piston, said valve piston being in sealing contact with said inner surface of said peripheral wall in said lower region of said inner cylinder, first means for connecting said inner cylinder with said outer cylinder in said upper region of said inner cylinder for product flow into said cylinders, and second means for connecting said inner and outer cylinder therebetween for product flow in said lower region of said inner cylinder, so that said dispensing piston sealingly slides in said outer cylinder against the outer surface of said peripheral wall of said inner cylinder toward the respective upper limiting position which is located higher than said upper limiting position of said valve piston permitting said product flow through said first connecting means into said outer cylinder while the valve piston is in its lower position blocking said outlet, said dispensing piston moving downwardly toward the lower position thereof expelling said product through said second connecting means and said outlet upon the upward movement of said valve piston toward the upper position thereof and further directing said product flow through said outlet upon a downward stroke of said valve piston.

3. The fluid product dispensing device defined in claim 2 wherein said inner and outer cylinders are coaxial.

4. The fluid product dispensing device defined in claim 2 wherein said inner and outer cylinder have a common product inlet open toflow from said product source.

5. A fluid product dispensing device, comprising:
mounting means for connection to a product source; and at least one dispensing unit below said source formed with an outlet spaced axially from said source, said at least one dispensing unit including:

an outer cylinder mounted on a vertical axis, said outer cylinder being formed with an annular peripheral wall said outer cylinder having an upper end open upwardly to a flow of a product and a lower end, an annular dispensing piston movable up and down in said outer cylinder between an upper limiting position and a lower limiting position of said dispensing piston, an inner cylinder in said outer cylinder, said inner cylinder being formed with another peripheral wall having an inner surface and an outer surface extending between an upper end and a lower ends of said inner cylinder, said outer surface of said other peripheral wall defining an inner surface of said outer cylinder, said inner cylinder being formed with a flange operatively connected with one of said upper and lower ends of said inner cylinder and attached to the respective one of said upper and lower ends of said outer cylinder, a valve piston movable up and down in said inner cylinder between a lower limiting position and an upper limiting position of said valve piston, first means for connecting said inner cylinder with sad outer cylinder for product flow into said inner and outer cylinders, second means for connecting said inner inner and outer cylinders and operatively connected with said flange of said inner cylinder, and means defining a bottom portion of said at least one dispensing unit formed with said outlet for product flow, so that said dispensing piston moves sealingly against said inner surface of said outer cylinder toward the upper limiting position thereof directing said product flow into said inner cylinder while said valve piston blocks said outlet for product flow in a bottom of said at least one dispensing unit in the valve piston lower limiting position, said dispensing piston moving downwardly toward the lower limiting position thereof upon the movement of said valve piston toward the upper limiting position thereof expelling said product flow into said bottom of said at least one unit and further directing said product flow through said outlet upon a downward stroke of said valve piston.

6. The fluid dispensing device defined in claim 5, further comprises a seal interposed between said flange of said inner cylinder said peripheral wall of said of said outer cylinder.

7. The fluid product dispensing defined in claim 5 wherein said dispensing and valve pistons are attached to a pair of actuating rods.

8. The fluid product dispensing device defined in claim 7 wherein said flange is attached to the upper end of said peripheral wall of said outer cylinder and has at least one aperture for both the rods of said dispensing valve and for influx of said product to the upper space of said dispensing cylinder and to the upper space of said inner cylinder.

9. The fluid product dispensing device defined in claim 5 wherein one of said means for connecting are a plurality of circumferentially separated apertures in the vicinity of lower end of said inner cylinder.

10. The fluid product dispensing device defined 5 wherein said another peripheral wall of said inner cylinder terminates at a distance from said bottom.

11. The fluid product dispensing device defined in 5 wherein said valve cylinder has a ring shaped hiatus the upper extremity of which is defined by a radially extended face of the upper end of said inner cylinder.

12. The fluid product dispensing device defined in claim 5 wherein said flange is attached to the lower end of said outer cylinder and defines said bottom of said at least one dispensing unit and wherein said another peripheral wall of said inner cylinder extends freely upward from said flange in such a manner that said inner cylinder as well as said outer cylinder are ring shaped and open upwardly in the same plane.

13. The fluid product dispensing device defined in claim 12 wherein said bottom of said at least one dispensing unit is formed by said annular peripheral wall of said outer cylinder.

14. The fluid product dispensing device defined in claim 12, further comprises a plurality of tubules connected to said outlet of the product flow.

15. The fluid product dispensing device defined in claim 14 wherein the total volume of said tubules is greater than the volume of the downward stroke of said valve piston within said bottom of the housing.

* * * * *